Figure 1:
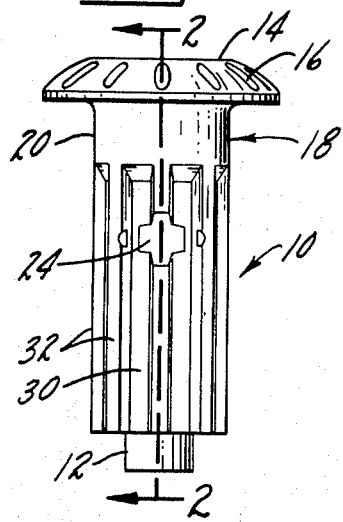

United States Patent [19]
Smith

[11] 3,717,927
[45] Feb. 27, 1973

[54] METHOD OF MAKING TIRE STUDS

[75] Inventor: Clarence J. Smith, Rockford, Ill.

[73] Assignee: The Shaler Company, Waupun, Wis.

[22] Filed: Sept. 15, 1970

[21] Appl. No.: 72,520

Related U.S. Application Data

[60] Continuation of Ser. No. 863,676, Sept. 25, 1969, abandoned, which is a continuation of Ser. No. 736,876, April 10, 1968, abandoned, which is a division of Ser. No. 542,075, April 12, 1966, Pat. No. 3,404,718.

[52] U.S. Cl....................................29/517, 29/525
[51] Int. Cl...................B21d 39/00, B23p 11/00
[58] Field of Search .........29/517, 516, 525; 152/210

[56] References Cited

UNITED STATES PATENTS

| | | | |
|---|---|---|---|
| 3,125,147 | 3/1954 | Hakka | 152/210 |
| 3,230,997 | 1/1966 | Carlstedt | 152/210 |
| 3,400,447 | 9/1968 | Woods et al. | 29/467 |
| 3,407,861 | 10/1968 | Hildebrant | 152/210 |
| 3,408,730 | 11/1968 | Anderson | 29/505 |

FOREIGN PATENTS OR APPLICATIONS 1,202,156   9/1965   Germany

*Primary Examiner*—Charlie T. Moon
*Attorney*—Parker, Carter and Markey

[57] ABSTRACT

This application discloses a tire stud and method of making the same by inserting a hard, wear resistant pin into frictional engagement with interference means in a socket in a tire stud body section such that the end of the pin is spaced from the bottom of the socket, and securing said pin in said socket against displacement during the use of the tire stud.

5 Claims, 5 Drawing Figures

PATENTED FEB 27 1973　　　　　　　　　　　　　　　3,717,927

STEP 1

STEP 2

STEP 3

STEP 4

STEP 5

INVENTOR.
Clarence J. Smith,
BY Parker & Carter
Attorneys.

METHOD OF MAKING TIRE STUDS

This is a continuation of Ser. No. 863,676, filed Sept. 25, 1969, now abandoned which was a continuation of Ser. No. 736,876 filed Apr. 10, 1968, now abandoned, which was a division of Ser. No. 542,075, filed Apr. 12, 1966, now U.S. Pat. No. 3,404,718, issued Oct. 8, 1968.

This invention relates to a method for making antiskid studs for vehicle tires and also relates to the studs made by such a method.

An important object of the invention is to utilize components with commercially available tolerances to obtain a tire stud part correctly dimensioned as to its overall length so that it properly projects from a tire after mounting.

Another object of this invention is a method for making tire studs in which problems of controlling dimensions in making such studs are substantially reduced.

Another object is a method in which a tire stud is made by inserting a wear-resistant pin in an elongated socket without requiring critical control of the length and cross section of said socket.

Another object is a method for making tire studs in which a wearing pin insert may be selectively positioned within a socket without fully inserting said pin therein, whereby said position is maintained for a subsequent step of securely fixing the wearing insert within the shell.

Another object is a method for making tire studs wherein a shell with an enlarged head and an elongated shank containing a socket is joined to a wearing pin insert in a few controlled steps without critically controlling the length and diameter of the socket and the length of the insert in order to still obtain a completed tire stud with a high degree of dimensional accuracy relative to the overall length.

Another object is the tire stud prepared by the method of the foregoing objects in which a wearing pin extends out of a shell a preselected distance so that the length of the completed stud conforms to a selected accuracy for subsequent use in a given vehicle tire.

Another object is a tire stud prepared by the method of the foregoing objects in which a wear-resistant pin is securely fixed by various means within a socket of a shell without requiring the pin to be bottomed in said socket.

Another object is a tire stud with a high degree of dimensional accuracy.

Another object is a tire stud that will tightly interlock in the tire and will not rotate.

Another object is a swaged tire stud.

Another object is a method of securing together the shell and carbide insert of a tire stud to obtain a high degree of dimensional accuracy.

The foregoing objects are attained along with other objects which will become apparent from considering the following disclosure which includes drawings.

Figure 2:
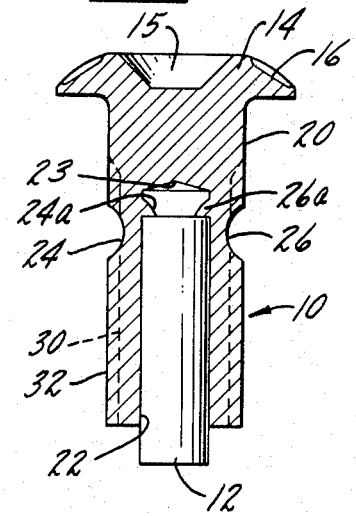
Figure 3:
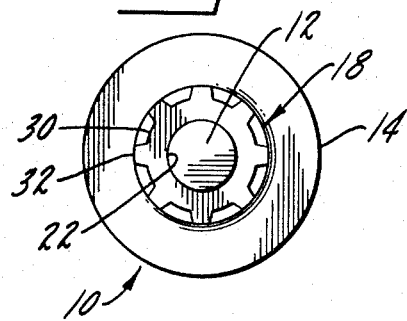
Figure 4:
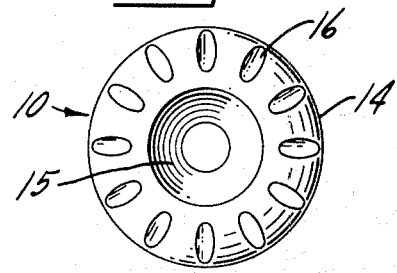
Figure 5:
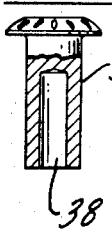
Figure 5:
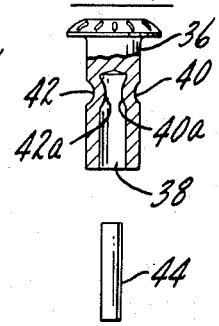
Figure 5:
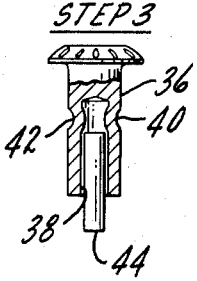
Figure 5:
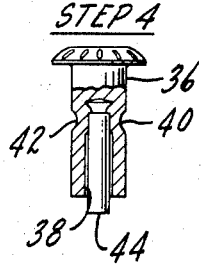
Figure 5:
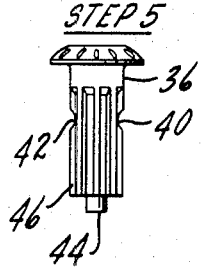

FIG. 1 is a side view of the stud with insert in place;
FIG. 2 is a section taken on the line 2—2 of FIG. 1;
FIG. 3 is a bottom view of FIG. 1;
FIG. 4 is a top view of FIG. 1; and
FIG. 5 is a sequence of steps in the method of assembly.

The stud is illustrated as having an integrally formed body section or shell, shown generally at 10, in which is mounted a wear-resistant pin 12, for example tungsten carbide, extending out of the shell a preselected distance. The shell 10 has an enlarged head 14 in the general shape of a truncated cone. The head is shown with a central recess or well 15. The topside of the head has a plurality of smaller wells or pits 16. The wells and pits contribute to a more secure anchoring of the stud when it is positioned in place in a vehicle tire. Extending from the head is an elongated shank 18 which is shown with a continuous wall 20 shaped so that the shank is formed as a cylinder. Inside the shank is a socket 22 shown as being circular along a substantial portion of its axial length. The socket bottom 23 is shown as the tapered cone.

The shank is shown with two or more crimps or indents such as 24 and 26 which provide projections 24a and 26a in the bore of the shell. The projections approach each other or close the bore sufficiently such that when the wear resistant material is inserted, an interference fit is created. Thus the wear resistant material can be freely inserted until it hits the interference fit after which it must be pushed into the reduced area until its position is desirably fixed. This provides an interlock so that the insert will hold its position during subsequent handling and permanent fixing of the insert within the shell. The interference means may be variously positioned along the shank to provide different initial frictional engagements to thereby better accommodate any desired changes in different embodiments.

The continuous wall 20 of the shank is shown with a plurality of grooved deformations, one of which is indicated at 30. Such grooved deformations are shown as alternating with ribs, one of which is shown at 32. The alternating grooves and ribs represent, in the illustration, a plurality of swage deformations which have been impressed in the continuous wall of the shank to securely fix the pin 12 within the socket 22. The swage deformations can be impressed by moving the elongated shank with the mounted pin through a swage die in which a plurality of swaging elements are spaced so that the material of the shank can flow between the swaging elements during the swaging formation. Such a cold metal flow in the illustrated embodiment is represented by the ribs 32. In practice, the shell is slightly elongated by such swaging, but such elongation is easily controlled in order to still obtain a completed stud of accurate dimensions in its overall length.

The method for making the tire studs can be illustrated by the sequence of steps shown in FIG. 5. In step 1, the left view in FIG. 5, a body section 36 is seen provided with a substantially uniform diameter socket 38. This blank is formed without critical dimensioning of the socket within the body section. Such dimensioning would include the axial length of the socket, its diameter, and the distance between the termination of such socket in the body section and the enlarged head. In the next step, a pair of spaced, opposed crimps 40 and 42 are formed in the shank of the body section so that corresponding deformations 40a, 42a form a reduced portion in the socket at that place. A pin of wear-resistant material 44 is aligned with the socket for insertion as shown in step 2. The length of the crimp within the socket need not be critically determined. The pin is inserted into the socket and moved into frictional engagement with the deformations, as indicated in step 3 of FIG. 5. Appropriate forces are applied to the pin and it is moved further into the socket while maintaining interlocking engagement with the reduced portion or interference means within the socket. This movement is continued until the outer end of the pin extends out of the shell a preselected length at which time the inner end will still be short of the socket bottom. This results in the completed stud with desired accurate dimensioning of its length. This is indicated by step 4 in FIG. 5. In this embodiment, the deformations 40a, 42a are further deformed by the advancing end of the pin as it is moved in frictional engagement through the reduced portion. After the pin is moved to the desired degree, the frictional engagement of the pin within the socket will cause the pin to retain its position until it is securely fixed within the shell. This step of securely fixing the pin is indicated in step 5 of FIG. 5 wherein the plurality of swage deformations, indicated generally at 46, are impressed in the body section. Since the pin 44 is of a wear resistant material much harder than the material of the body section, the pin can deform the interference means disposed within the socket upon application of force to the pin. In this embodiment, the pin may be said to be in deformable engagement with the interference means within the socket.

The use, operation and function of this invention are as follows:

The tire stud must have an accurate, overall length, and this is controlled by the preselected length of the pin or insert which extends out of the stud. The wear of the pin is related to the wear of the tire in such a way that the length of the pin extending out of the shell is desirably maintained relatively constant as both the pin and the tire undergo wear. Such pin material is, of course, more wear-resistant than the shell. For example, the pin may be of tungsten carbide while the body section may be made of low carbon steel. Other materials may be used, including non-carbide inserts such as ceramics or other wear-resistant equivalents.

If the pin insert wears quickly relative to the tire, the anti-skid function of the studs will be prematurely lost through wear, and if it wears too slowly, the pin will extend too far out of the tire and lead to undesirable effects. This will include a loss of the desirable working relationship between the tire and pin contact surfaces as well as the possibility of aggravated road damage.

The method of this invention and the tire stud produced thereby permits a pin insert of a given wear-resistant material to be readily mounted with a preselected extension from the shell irrespective of the length of the socket in the shell or body section. It is possible to have available, for the practice of this method, standard shells made with sockets having commercially available tolerances in the length and diameter of the sockets. Also, standard inserts may be used with commercially available tolerances. By this method a stud with desirable, accurate dimensions of overall length can be formed from components having such commercial tolerances.

An interference will be formed within the socket of the shell by means such as crimping the continuous walls of the shank. Various equivalent interferences may be provided by other means which lead to a reduced portion in the socket to provide such interference. While the crimp is particularly illustrated, it will be recognized that other reduced portions can replace crimping, such as providing a portion of the socket with a reduced diameter, forming the socket with an inwardly formed flange, providing ribs within the socket, or the like. In any event, a tire stud with such interference formed in the socket is combined with a pin insert of a given wear-resistant material by first inserting the pin in the socket until it frictionally engages the interference. A slight force will be necessary to move the pin into the interference, and such frictional engagement will allow the wear-resistant pin to be inserted controllably until the preselected extension on the shank is attained. The pin then can be securely fixed in the body section so that it can stand up under its expected use as a tire stud in operation.

The insert is preferably mechanically held in the shell by swaging which does not require any adhesives, soldering, brazing and the like, all of which involve an extra step and are more expensive for many embodiments. While swaging is the preferred step for many embodiments, it is understood that other bonding and fixing means may be used and may even be desirable for certain embodiments using certain types of materials. Such other means may include brazing, soldering, resin adhesives and the like.

The swaging step, in addition to providing a tight interlock between the insert and shell, also results in a ribbed exterior along a portion of the shell's exterior surface such that when the stud is forced into a bored or molded hole in a tire, the ribbed or fluted exterior surface will tightly interlock with the rubber. This will prevent the stud from tending to rotate or shift, thereby reducing frictional wear, abrasion of the rubber, excess heat generation, etc. The lands or top surfaces 32 of the ribs may be considered to be slightly larger in diameter than the original shell since the swaging action will probably cause the metal in the intermediate areas to flow outwardly somewhat. Thus, the diameter of the shell across the ribs may be somewhat greater than the diameter of the smooth portion of the shell directly next to the head 14.

It is the distance from the top of the enlarged head to the end of the insert, or the overall length of the stud, that is important. This determines how much the insert projects beyond the tire since the blind bores in the tire are of predetermined and known length. This dimension must be closely and accurately controlled to obtain most efficient use of the stud. Tolerances are extremely difficult to maintain in a product of this nature, particularly if the insert bottoms in the shell. By the present arrangement, it will be noted that the distance between the inner end of the insert and the bottom of the channel or socket in the shell is of no importance and, as a matter of fact, may vary somewhat from one stud to another. But what is important is that this space or gap exists. If the insert bottoms in the shell, the contact between the inner end of the insert and the bottom of the shell will control the amount that the insert projects out of the shell; therefore, the length of the stud. Since the overall length must be accurate, it is not possible to use components with commercially available tolerances. The tolerances must be critically controlled in such a prior art method. Since tire studs of this nature must be rapidly produced as a high volume item, exceedingly accurate tolerances in the dimensions of the components cannot be maintained. For example, the depth of the socket or channel in the shell will vary from time to time. So will the length of the insert.

But by the present method and structure, the insert can be made to project the same amount, and any commercial variation in tolerances or dimensions will be taken care of by the gap between the inner end of the insert and the bottom of the shell socket. The completed stud can still be accurately dimensioned as to its overall length.

A plurality of such tire studs are mounted in the surface contacting area of a vehicle tire according to known methods which may include simply providing a plurality of sockets in the tire surface and then forcing the stud into such sockets by appropriate means so that the enlarged head is securely fixed within the tire and the wearing insert extends out of the tire.

The foregoing invention can now be practiced, and such practitioners will know that the invention is not necessarily restricted to the particular embodiments presented herein. The scope of the invention is to be defined by the terms of the following claims as given meaning by the preceding description.

I claim:

1. A method for making an antiskid tire stud by fixing a pin within a socket of a body section, said pin being of harder wearing material than said body section, including the steps of forming interference means within said socket, inserting said pin within said socket, moving said pin into frictional engagement with said interference means, terminating movement of said pin short of the socket bottom when the pin extends from the body section a preselected distance, and securely fixing said pin within said body section so it substantially resists displacement during the expected use of the tire stud.

2. The method of claim 1 further characterized in that said pin is securely fixed within said body section by swaging the body section.

3. The method of claim 1 further characterized in that said interference means is formed by crimping the body section so that a crimp causes a corresponding deformation to extend into the socket a sufficient distance to frictionally intercept the pin but to permit said pin to be moved in frictional engagement.

4. The method of claim 3 further characterized in that the body section has an elongated shank and an enlarged head joined to one end thereof and the socket is cylindrical in shape and enclosed by continuous metallic walls of such shank, and further including the step of inserting a cylindrical pin of wear-resistant material, and swaging the continuous wall of said body section to securely fix said cylindrical pin within said socket short of the socket bottom.

5. The method of claim 1 further characterized in that the interference means is a reduced portion in said socket, and said reduced portion is sufficiently dimensioned to intercept said pin but to permit said pin to be moved under force in deformable engagement until a preselected length of said pin extends out of said body section.

* * * * *